United States Patent
Boschet et al.

(10) Patent No.: US 6,470,544 B1
(45) Date of Patent: Oct. 29, 2002

(54) HOT PEELING DEVICE FOR A BLADE LEADING EDGE CAP

(75) Inventors: Patrick Boschet, Montigny-le-Bretonneux; Daniel Brunner, Soisy-sous-Montmorency; André Amari, Marly-la-Ville, all of (FR)

(73) Assignee: Eurocopter (FR)

( * ) Notice: Subject to any disclaimer, the term of this patent is extended or adjusted under 35 U.S.C. 154(b) by 0 days.

(21) Appl. No.: 09/460,562

(22) Filed: Dec. 14, 1999

(30) Foreign Application Priority Data

Dec. 17, 1998 (FR) .............................. 98 15929

(51) Int. Cl.$^7$ .......................... B21D 53/78; B23D 19/02
(52) U.S. Cl. ................... 29/23.51; 29/426.4; 29/889.6; 29/889.1; 156/584; 156/344
(58) Field of Search .......................... 29/426.1, 426.4, 29/426.5, 711, 791, 239, 244, 23.51, 889.6, 889.1; 254/362; 156/584, 344

(56) References Cited

U.S. PATENT DOCUMENTS

| | | | | |
|---|---|---|---|---|
| 3,501,385 A | * | 3/1970 | Jasberg | 156/584 |
| 3,689,396 A | * | 9/1972 | Casagrande et al. | 156/584 |
| 3,929,555 A | | 12/1975 | Sanders | |
| 4,045,301 A | * | 8/1977 | Wens et al. | 156/584 |
| 4,352,707 A | | 10/1982 | Masica, Jr. et al. | |
| 4,806,213 A | * | 2/1989 | Leiponen et al. | 204/194 |
| 5,199,156 A | * | 4/1993 | Rossi | 156/584 |
| 5,290,380 A | * | 3/1994 | Gitelman et al. | 156/584 |
| 5,344,521 A | * | 9/1994 | Ohsaki | 156/584 |
| 5,423,931 A | * | 6/1995 | Inoue et al. | 156/584 |
| 5,656,127 A | * | 8/1997 | De Niel et al. | 156/584 |
| 5,810,962 A | * | 9/1998 | Annenkov et al. | 156/584 |
| 6,156,150 A | * | 12/2000 | Nishida | 156/584 |

FOREIGN PATENT DOCUMENTS

| | | |
|---|---|---|
| DE | 34 25 331 | 1/1986 |
| EP | 0 854 208 | 7/1998 |
| JP | 59 142115 | 8/1984 |
| JP | 63 281807 | 11/1988 |
| WO | 91 15093 | 10/1991 |

* cited by examiner

Primary Examiner—S. Thomas Hughes
Assistant Examiner—Marc Jimenez
(74) Attorney, Agent, or Firm—Piper Rudnick; Michael L. Kenaga

(57) ABSTRACT

In order to remove a plate made from a material that can be heated by electromagnetic induction and retained on a supporting member by a heat-fusible adhesive, an inductor is displaced facing at least one strip of the plate in order to heat the strip by induction and heat the adhesive by conduction until the adhesive softens, and a tearing tool is driven so as to tear out the heated strip by hot-peeling. The inductor and the tearing tool are displaced jointly relative to the plate and the supporting member by means of a mobile frame, which is displaced on a stationary frame on which the supporting member and the plate are fixed.

8 Claims, 2 Drawing Sheets

HOT PEELING DEVICE FOR A BLADE LEADING EDGE CAP

Figure 3:
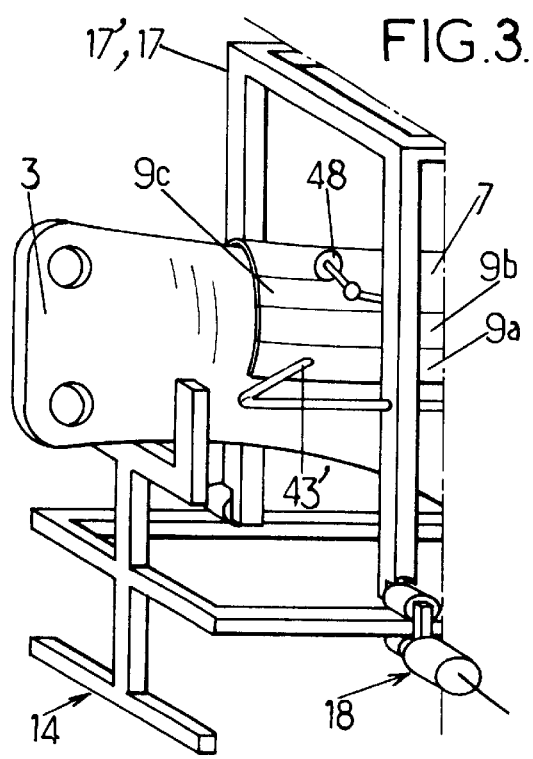

The invention relates to a method and a device for removing a plate made from a material that can be heated by electromagnetic induction, generally a metal sheet, and retained on a supporting member by a heat-fusible adhesive substance that will at least soften when heated, i.e. loses its mechanical characteristics to a large extent under the action of heat.

The plate made from a material that can be heated by electromagnetic induction and which can be removed by the method and device proposed by the invention may be a substantially flat or curved plate and may have several flat parts adjoining one or more curved parts, formed by folding or bending, and such a plate is preferably made from metal or metal alloy having good properties for heating by electromagnetic induction.

The adhesive substance retaining such a plate on a supporting member must be one which is heat-fusible in that it will at least soften under the effect of heat and, for the purposes of the invention, this adhesive substance might not or need not necessarily be brought to the liquid state by fusion.

By supporting member is meant any base of any nature, for example metal or composite, which is sufficiently rigid to be capable of supporting a plate as defined above which is retained on this base by a layer or film of a heat-fusible adhesive as defined above and thus having a so-called "plastic range" in its temperature range, which is a minimum of approximately 20° C. higher than the range of its vitreous transition temperature, i.e. a temperature range at which the bonding forces of the adhesive substance may be reduced by 80%. The adhesive may be a glue which is initially applied to the base in a gel, paste or liquid state or alternatively a heat-fusible film adhesive, for example a thermoplastic material or even a thermosetting network or alternatively may be a thermoplastic or thermosetting resin in the matrix of a base having a composite structure, for example resin used to impregnate reinforcing fibres of one or more surface layers of a stratified composite structure constituting the supporting member for a plate to be removed using the method and device proposed by the invention.

By way of example, the supporting member may be a second plate or sheet of metal or any other sheet, optionally a coating sheet, as would be the case for example with a member such as an aircraft door, consisting of two metal plates or panels bonded one against the other, the method of the invention enabling one metal plate or panel to be removed with a view to repair without damaging the other, by acting on the heat-fusible adhesive substance between the two plates or panels. The base may also be the core, for example a material with a honeycomb structure, of a sandwich panel, for example the floor of an aircraft, wherein one of the two skins on either side of the core is specifically the metal plate to be removed by means of the method and device proposed by the invention.

The base or supporting member may also be a composite structure constituting the inner core of a rotor blade, for example of a helicopter, this internal core, with the spar or spars and the filler body or bodies of the blade being enclosed by a stratified external shell forming in particular the lower surface and upper surface skin of the blade, which meet along the leading edge and the trailing edge of the blade, in which case the plate to be removed by the method and device proposed by the invention may be a protective cap at the leading edge of the blade.

Although the method and device proposed by the invention may be used in numerous applications, this method and this device are described in a context in which they apply to the removal of a protective cap from the leading edge of a rotor blade, in particular of a helicopter, since this application is of particular interest to the applicant.

It is known that the leading edge of helicopter rotor blades is protected, in particular against erosion and impact by foreign bodies, by a cap which is generally made from metal sheet (titanium or stainless steel; or even nickel or aluminium), bended to produce a substantially U-shaped form and which is bonded onto the underlying structure of the blade, which may be metal and/or composite, so that the leading edge and the lower surface and upper surface of the blade adjacent to it are covered, at least over a part of the blade span. During the service life of the blade, it is necessary to remove the protective cap from the leading edge to replace it with a new cap, generally as a result of three types of circumstances: as a result of damage to the blade due to impacts on its leading edge and its protective cap; as a result of damage to the protective cap due to erosion; and, in the case of a composite blade, when superficial layers of the composite structure of the blade have started to come unstuck (peeling of the stratified lower and upper surface skin in the region of the leading edge).

At present, the protective cap is manually stripped from the leading edge in a manner that will be described with reference to FIG. 1, which depicts a composite helicopter rotor blade shown by reference 1, at the end of its aerodynamically profiled part, which is attached by a blade neck 2 of varying section to a blade foot 3, having two bores 4 by means of which the blade 1 is joined by two pins to a rotor hub or a linking member for connection to this hub in a known manner. The leading edge 5 of the blade 1 as well as the adjacent parts of the upper surface 6 and the lower surface (not visible in FIG. 1) of the blade 1 are covered by a metal cap 7 which protects the leading edge, this metal sheet being substantially U-shaped and bonded onto the underlying composite structure of the blade 1 by an adhesive substance as defined above.

The operation of removing the cap 7 firstly consists in using a tool of the wood shears type to make a nick or cut to initiate the removal at the start of the operation, guided substantially along the length of the cap 7, i.e. along the span of the blade 1, starting at a transverse edge (along the chord of the blade 1) of the cap 7, for example from the edge 8 of the cap 7 turned towards the blade foot 3 so as to create a narrow tongue which will be the start of a longitudinal strip 9 of the cap 7, and then inserting the end 10 of this strip 9 into the slot of the shaft 12 of a tool 11 similar to a key such as used for opening a sardine can, the handle 13 of which is manipulated by an operator who turns the tool 11 on itself, about the longitudinal axis of its shaft 12, so as to wind the strip 9 in a spiral about itself around the shaft 12 of the tool 11, by means of which the operator is thus able to make a mechanical tear of the strip 9 by a cold-peeling process.

This manual tearing operation for cold-peeling a longitudinal strip 9 off the cap 7, performed step by step on adjacent strips to remove the entire cap 7, is a delicate operation endangering the operator because each strip 9 wound in a spiral about the tool 11 of the sardine tin key type can behave in the manner of a spiral spring and can release suddenly, whilst the face of the operator needs to be very close as he visually checks the process of tearing back a strip 9, the metal of this strip 9 being held on the underlying composite structure of the blade 1 by a greater or lesser amount of adhesive as it progresses, and as far as possible without tearing the superficial layers of the stratified composite structure of the shell of the blade 1. Regardless of all the precautions taken during this manual operation, bearing in mind the surface treatments applied to the composite blades during manufacture and the adhesion forces built up by the adhesive substances used, consequential damage is often caused to the superficial layers of the composite shell of the blade 1 underneath the cap 7.

EP-A-0 854 208 also discloses a method and a device for removing a cap or a metal shield to protect the leading edge of a helicopter blade against erosion, where the cap or shield is fixed to the underlying metal or composite structure of the blade by a layer of non-metal adhesive by producing an electric field between the metal cap and an electrode in the presence of an electrolyte between the cap and the electrode, which enables the cap to be removed by an electro-chemical machining process.

The main drawback of this method resides in the use of an electrolyte, either in the form of an electrolytic bath in which the blade is dipped until the cap to be removed is totally submersed, which can be difficult to do without letting the electrolyte come into contact with other parts of the blade which might be metal, thus damaging these parts, or by displacing the electrode, continuously or step by step, mounted on a mobile frame, facing the cap of the blade secured on a stationary frame, supplying electrolyte through orifices provided in the electrode for example, which circulates in the space between the electrode and the cap through an electrolyte supply circuit which is displaced with the gantry and requires means to recuperate and recycle the electrolyte.

Another drawback of these known methods and devices is that the electrode must be of a specific shape with a concave U-shaped recess that will surround and substantially conform to the external shape of the cap and the leading edge of the blade. In addition, since blades, and in particular helicopter rotor blades, have an aerodynamic profile which twists about a longitudinal axis of the blade, the electrode which moves with the gantry must also move on the gantry, depending on the span of the blade, across an arcuate path centred on the axis of the twist but without causing any interference between the surrounding electrode and the surrounded cap.

Another disadvantage of the methods and devices disclosed in EP-A-0 854 208 is the fact that if the underlying structure of the blade is metal and the existing layer of adhesive has any gaps or has metal members inserted through it which are in contact with the metal structure of the blade, the electrochemical machining process can cause damage to the blade structure.

The underlying problem of the invention is to remedy the disadvantages of the above-mentioned methods, tools and devices used to remove protective metal caps from the leading edges of rotor blades and propose a method and a device that will meet the various practical demands more efficiently than those used in the present state of the art.

More generally, the underlying problem of the invention is to propose a method and a device that will enable a plate made from a material that is capable of being heated by electromagnetic induction, as is generally the case with the protective cap used for the leading edge of a blade made from sheeting, either of metal or metal alloy, in particular titanium or stainless steel, if said plate, which may be substantially flat or curved, is retained on a supporting member by an adhesive substance which at the very least softens when sufficiently heated and referred to hereafter as a heat-fusible adhesive in the broadest sense of the term, which is generally also the case with the adhesives used to bond protective caps for leading edges of blades to the underlying metal or composite structures of rotor blades of a helicopter.

To this end, the method proposed by the invention as a means of removing a plate which is capable of being heated by electromagnetic induction and retained on a supporting member by a so-called "heat-fusible" bonding substance, which loses a part of its mechanical characteristics and at least softens under the action of heat, is characterised in that it comprises at least the following steps:

placing at least one electromagnetic inductor facing at least one strip of said plate so as to heat said strip of plate by induction and said adhesive underneath said strip by conduction to a temperature in the plastic temperature range of the adhesive so that said adhesive softens, at least in a layer of adhesive in contact with said strip, and driving at least one tool for mechanically hot- tearing said heated strip so as to tear said plate from said supporting member in a region in which said adhesive has softened.

The basic principle of the invention is to combine two physical-chemical principles which are, firstly, to use the plate made from a material which can be heated by electromagnetic induction as a heating resistor which can rise in temperature very rapidly in order to heat the adhesive by conduction, at least in a layer of adhesive in contact with the plate, so that this heated adhesive is able to reach a temperature at least approximately 20° C. above its vitreous transition temperature within a few seconds, i.e. a temperature located in the plastic range of the temperature range of the adhesive (for example a temperature ranging between about 160° C. and about 180° C. in the case of what are referred to as 120° C. category adhesives or, more generally, in a temperature range between about 50° C. and about 350° C.), this being a temperature at which the bonding forces of the heated adhesive substance can be reduced by some 80% of the value they exhibit when the adhesive substance is cold or at normal ambient temperature. The second principle applied is that of using a tearing force, preferably constant or continuous, as a means of dislodging the plate from its supporting member by hot-peeling an induction-heated strip of this plate, given that the bonding forces are reduced at least in a layer of adhesive, in contact with this heated strip of the plate, layer of adhesive which is in turn heated by conduction to a temperature located in its plastic range.

In order to apply this dual principle, the method proposed by the invention incorporates a step whereby the plate is heated by induction, being capable of transmitting the requisite thermal power, associated with a step of hot-peeling using a tearing tool so as to produce a sufficient peeling angle (between the plane of a strip of plate or plane at a tangent to this strip of plate still bonded to the supporting member, at the point of the instantaneous tearing action, and the plane of a strip portion or plane at a tangent to a strip portion which has just been torn off, at the tearing off plane) to dislodge said strip of plate from the supporting member.

One of the main advantages of the invention is that advantage can be taken of the speed at which strips of the plate are heated by electromagnetic induction heating, so that adjacent strips of the plate can be mechanically torn off, by hot-peeling for example, and the fact that the conduction heating of the adhesive is limited to a relatively thin layer in contact with the heated strip, without heating the supporting member abnormally to a temperature that would be high enough to damage the supporting member, which might be a composite base forming the core of a rotor blade, for example. Applying induction heating by using an electromagnetic inductor is all the more efficient if the plate is made from a non-magnetic metal, as is generally the case with the protective metal caps used on the leading edges of blades, and has a different conductivity and thermal capacity as compared with the bonding substance and the substance(s) of the supporting member, so that the exchanges of heat for heating a strip of plate by induction and for heating the underlying layer of adhesive by conduction are sufficiently rapid to allow removal by mechanically tearing the heated strip of plate, for example by hot-peeling, with or without removing some of the adhesive substance. In effect, the forces induced by hot-tearing in the adhesive must be reduced to a minimum to avoid overheating the supporting member, in particular the underlying composite structure of the blade, and thus risking damage to this supporting member.

In other words, heating a strip of plate by electromagnetic induction allows a layer of adhesive substance in contact with this strip of plate to be heated quickly enough by conduction to soften this layer of adhesive substance, to the point where it is within its plastic temperature range, but without heating the layer of adhesive substance in contact with the supporting member to a temperature so high that it will be critical to this supporting member.

The interest of the method proposed by the invention and its originality reside in the option of being able to bring the adhesive in contact with a strip of plate to be torn off to a temperature of least resistance of this adhesive due to the very high speed of heating by induction whilst maintaining the interface between the adhesive substance and the supporting member at a temperature below a given threshold, depending on the structure of this supporting member.

For the reasons outlined above, the method proposed by the invention advantageously incorporates at least a step which consists in displacing at least one inductor and at least one tearing tool jointly relative to the plate and the supporting member. This being the case, the tearing tool may be a key of the type such as used with a sardine can, driven in rotation about itself (about the longitudinal axis of its shaft) as this key is simultaneously displaced in conjunction with the inductor, a key of this type being capable of producing an angle appropriate to the hot-peeling process.

In particular, the method may incorporate steps consisting in:

displacing, preferably continuously, at least one inductor facing at least one strip of said plate and displacing, preferably continuously, at least one tearing tool between said heated strip of plate and said supporting member, i.e. the tearing tool, which may be a wedge-shaped pad or a roller, is displaced on a level with the adhesive substance between the plate and its supporting member.

Advantageously, the method proposed by the invention may also incorporate at least one of the following steps:

a step which consists in controlling the displacement speed of the inductor so as to adapt it to the thermal power needed to impart to the adhesive heated by the plate a temperature located within the temperature range of the plastic range of the adhesive and preferably to interrupt or reduce heating of the plate by the inductor when the difference between the instantaneous speed and a nominal displacement speed of the inductor relative to the plate exceeds a predetermined threshold, allowing safety parameters to be applied to the displacement kinematics, a step which consists in controlling the displacement speed of at least one inductor relative to said strip of plate at least at one measured temperature, selected from at least one temperature of said heated strip, at least one temperature of said adhesive and at least one temperature substantially at the surface of said supporting member, measured at the interface between said supporting member and said adhesive in order to avoid overheating said supporting member, a step which consists in controlling the displacement speed of at least one inductor and/or the thermal power applied by said inductor at one temperature, at least, prevailing substantially at the surface of said supporting member so as to interrupt or reduce the heat applied by the inductor when said temperature reaches a predetermined threshold, for the same purpose as that mentioned above, a step which consists in controlling the position of at least one inductor relative to the facing surface of said plate so as to adapt said position to at least one signal from at least one sensor detecting a position of said inductor relative to said plate in order to optimise the positioning, preferably in three dimensions, of the inductor relative to a strip of plate to be heated, a step which consists in cooling, preferably continuously, said supporting member at least in the region located to the rear of said tearing tool relative to the direction of displacement of the latter in order to protect the supporting member from heating to a critical degree, by cooling its surface very rapidly, thereby preventing any transfer of heat by conduction to the supporting member, and a step which, if working on a very wide plate, consists in cutting at least one strip in said plate, prior to tearing said strip after it has been heated, transversely to the length of the strips, for example the protective caps of the leading edge of blades with a wide chord, optionally with an integrated de-icing or anti-icing device, of main helicopter rotors which are heavy or of medium tonnages.

Advantageously, the method includes a process of hot mechanical tearing to hot-peel at least one heated strip.

The method proposed by the invention may also include a step which consists in driving at least one tool which tears by cold-peeling in order to tear off at least one non-heated strip from the plate, for example in at least one curved region of said plate having a low radius of curvature, albeit across only a small distance, in order to start or initiate removal of this strip of plate, for example with a tool similar to a key such as used with a sardine can, as described above.

The invention also relates to a device for implementing the method described above, which is characterised in that it comprises:

at least one stationary frame on which said supporting member fitted with said plate can be fixed, at least one mobile frame, which can be displaced relative to the stationary frame and bearing at least one mobile inductor and at least one mobile tearing tool, which are displaced respectively opposite at least one strip of said plate and in contact with said strip and substantially along the latter or between said strip and said supporting member when said mobile frame is displaced relative to said stationary frame.

Advantageously, this device also has first means, preferably motor-driven, to control the displacements of said mobile frame with said mobile inductor and said mobile tearing tool on said stationary frame in at least a first direction, substantially across the length of at least one strip of plate to be removed.

Simultaneously and advantageously, the device also has second means, preferably motor-driven, to control the positioning of said inductor and/or said tearing tool by displacement on said mobile frame in at least a second direction, transversely to said first direction, and substantially across the width of said strip of plate.

Advantageously, the device also has third means, preferably motor-driven, controlling the positioning of said inductor by displacing the inductor on said mobile frame in a third direction, substantially perpendicular to the first and second directions in order to adjust the space between said inductor and a strip of plate to be removed.

In order to optimise the relative positioning of the inductor and the tearing tool on the mobile frame, the device may also comprise fourth means, preferably motor-driven, to position the inductor and/or the tearing tool on the mobile frame at least substantially in said first direction in order to adjust the gap between the inductor and the tearing tool and follow the changing contour of the supporting member whilst maintaining the distances between them.

In order to protect the supporting member from any inadvertent overheating, the device may also have cooling means, preferably at least one jet of compressed air, which are driven by said mobile frame in order to cool said supporting member behind the tearing tool relative to the direction of displacement thereof.

Said tearing tool may have a roller which rolls on the supporting member, tearing therefrom a strip of plate that has just been heated, although, as mentioned above, the tearing tool may also have a pad in the form of a wedge pulled by the mobile frame so that it slides in the adhesive substance between the supporting member and a strip of plate to be torn off and/or a key of the type such as used with a sardine can driven in rotation about itself on the mobile frame and optionally co-operating with a roller or wedge pad in order to guarantee a suitable angle for hot-peeling.

The device may also have a least one tool for cutting strips, preferably adjacent, in said plate, said cutting tool also being driven by a frame, optionally the one supporting the inductor and the tearing tool, which is mobile relative to the stationary frame.

In order to operate the appropriate steps whereby the displacement speed and/or the inductor power are controlled, it is of further advantage if the device also has at least one temperature sensor and/or at least one sensor to detect the position of the inductor relative to the plate, the temperature and/or position sensor or sensors being advantageously mounted on the mobile frame.

Finally, the device also advantageously has a monitoring and control unit, which remotely controls at least the power and/or frequency of the electric supply of high frequency current to the inductor and, preferably also, at least one of said first, second, third and fourth means for controlling the displacement of the mobile frame relative to the stationary frame and the positioning of the inductor and/or the tearing tool on the mobile frame, and, optionally, the cooling means and cutting tool.

Figure 4:
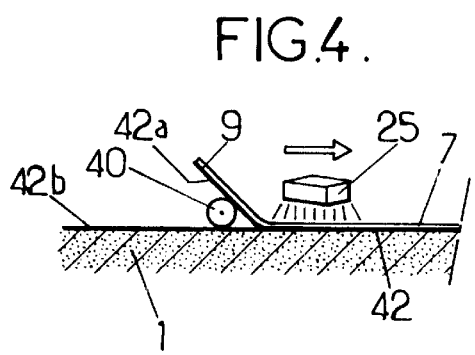
Figure 1:
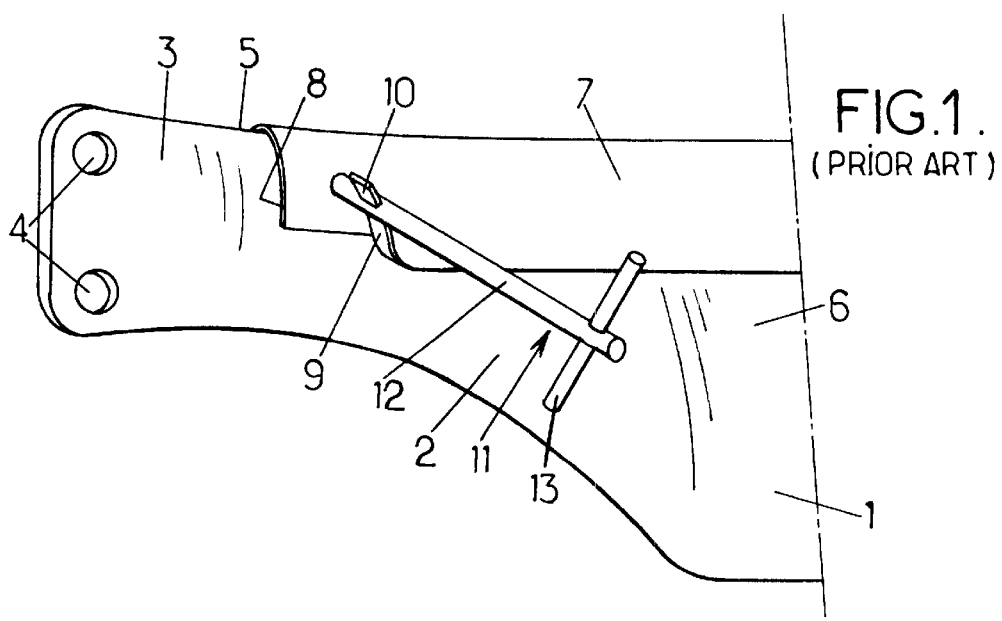

Other features and advantages of the invention will become clear from the description below, which is not restrictive in any respect, of an example of an embodiment, given in conjunction with the appended drawings, of which:

FIG. 1 is a schematic illustration in plan view of a part of a blade with a protective cap for the leading edge, a strip of which being torn away using a method of the prior art, described above, FIG. 2 is a partial schematic view in perspective of a helicopter rotor blade with a protective cap for the leading edge mounted in a device as proposed by the invention, which implements the stripping method proposed by the invention, FIG. 3 is a partial view similar to that of FIG. 2, illustrating additional means of the device illustrated in FIG. 2, FIG. 4 is a partial schematic view of a side elevation illustrating how an inductor and a tearing tool of the device illustrated in FIG. 2 co-operate with a strip of protective cap which is adhered to the blade and has to be torn off.

Figure 2:
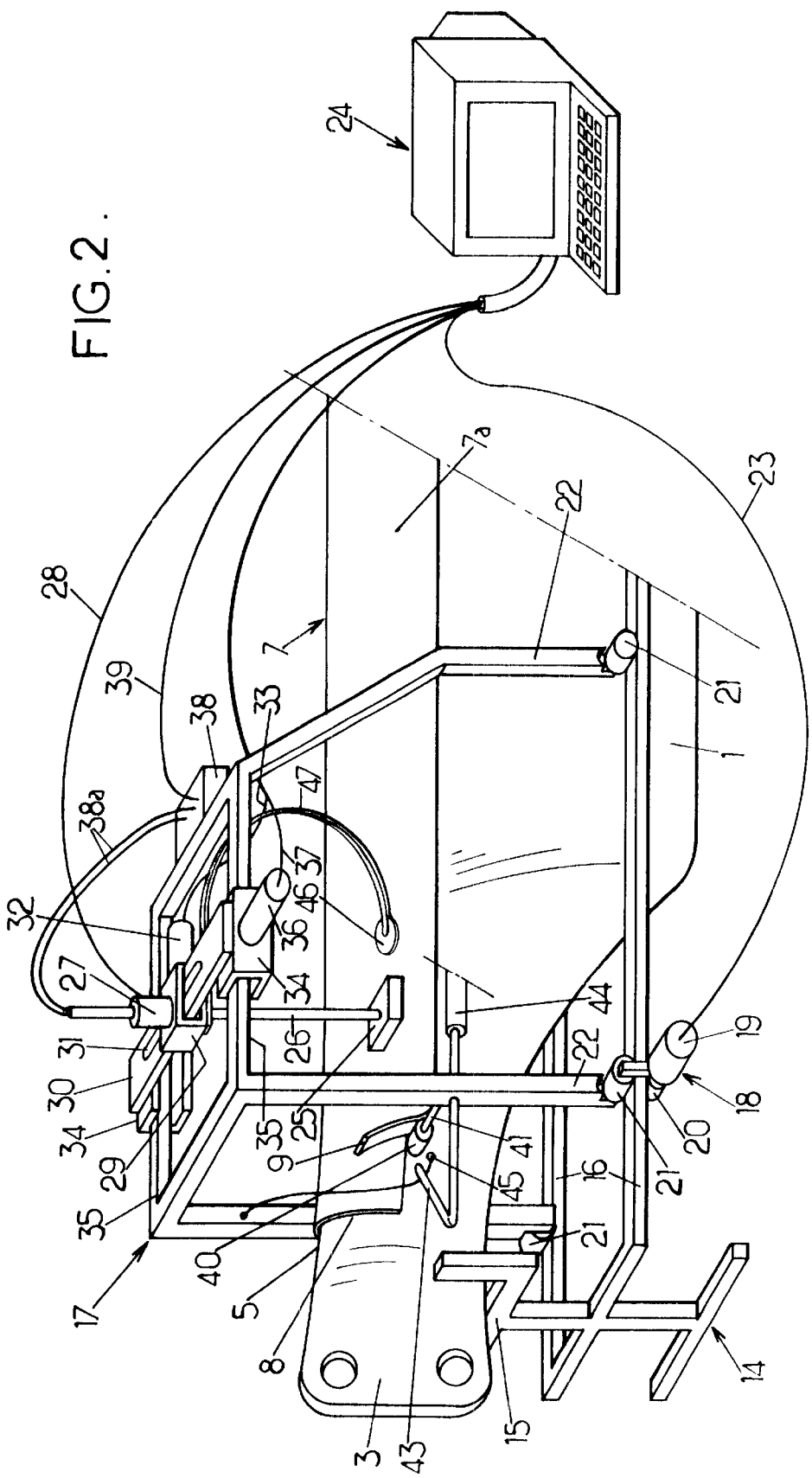

FIG. 2 shows the blade 1 of FIG. 1, fitted with its cap 7 of non-magnetic metal or metal alloy, for example titanium or stainless steel, protecting its leading edge 5, the blade 1 being secured, with its leading edge 5 and its cap 7 directed upwards, on a stationary frame 14 having cradles such as 15 in which the blade 1 is supported at least by its two ends. The stationary frame 14 has two longitudinal rails 16, extending along the span of the blade 1, and on which a mobile frame or gantry 17 is movably mounted so as to be displaced across the length of the cap 7 and preferably across the entire span of the blade 1 by means of motorised driving means 18.

By way of example, these motorised driving means 18 may comprise an electric motor 19 driving a motor roller 20 which rolls along a rail 16, the unit comprising motor 19 and roller 20 being suspended from the shaft of one of the rollers 21, mounted loosely in rotation on the feet of uprights 22 of the gantry 17 so that the gantry 17 is able to roll along the rails 16.

The motorised driving means 18 may be of any other type, having rotary motors of any appropriate nature, with a driving action operated by a pinion, for example, meshing with a rack along at least one of the two rails 16 or alternatively a linear motor or a jack mounted between a fixed point of the stationary frame 14 and a fixed point of the gantry 17, although using a jack will have disadvantages in view of the space it will require to travel along the requisite path across the length of the cap 7.

The motorised driving means 18 are remotely controlled via the line 23 running from a monitoring and control unit 24 of the microcomputer type having an input keyboard and a display screen.

The gantry 17 supports an electromagnetic inductor 25 fixed to the bottom end of a straight shaft 26, substantially perpendicular to the plane of the two rails 16 and crossing through other motorised driving means 27, supported by the upper framework of the gantry 17 and enabling the position of the inductor 25 on the gantry 17 to be varied vertically and hence in relation to the stationary frame 14 and the blade 1, i.e. substantially perpendicular to the length of the cap 7 and the span of the blade 1. These motorised means 27, comprising for example an electric motor driving in rotation an axially retained nut co-operating with a threaded part of the shaft 26 so as to displace it in vertical translation with the inductor 25, are preferably also remotely controlled via the line 28 running from the monitoring and control unit 24. These motorised drive means 27 are supported by a slider 29 mounted so as to slide on a cross-piece 30 also supported by the upper framework of the gantry 17 and having a longitudinal orifice 31 through which the shaft 26 extends. The displacements of the slider 29 with the drive means 27 along the cross-piece 30, i.e. perpendicular to the shaft 26 and the rails 16, are controlled by other motorised drive means 32, preferably also comprising an electric motor, of the stepper type for example, driving a motor roller (not illustrated) rolling on a track of the cross-piece 30 or a pinion meshing with a rack on the cross-piece 30, and these motorised drive means 32, which allow the inductor 25 to be positioned on the gantry 17 transversely to the rails 16, are remotely controlled via the line 33 from the unit 24.

The ends of the cross-piece 30 are joined to slide blocks 34 each mounted so as to slide respectively along one of two spars 35 of the upper framework of the gantry 17 and one of the slide blocks 34 supports motorised drive means 36, remotely controlled from the unit 24 via the line 37 to drive the cross-piece 30 with the slide block 34, the drive means 27, the shaft 26 and the inductor 25 on the gantry 17 in a direction parallel with the direction of displacement of this gantry 17 on the rails 16.

The motorised drive means 27, 32 and 36 therefore enable the inductor 25 to be positioned on the mobile gantry 17 in three perpendicular pairs of directions, one of which is parallel with the direction in which the gantry 17 is displaced on the frame 14 by means of the drive means 18, the positioning of the inductor 25 on the gantry 17 and the displacement thereof on the frame 14 being remotely controlled by the unit 24, continuously or intermittently as required.

The gantry 17 also supports a high-frequency generator 38 supplying the electromagnetic inductor 25 via conductors 38a passing through the interior of the shaft 26, the generator 38 (the power supply of which is not illustrated) being in turn driven remotely from the unit 24 via the line 39.

The gantry 17 also supports a tearing tool 40 which, in this particular example, is a roller designed to roll on the composite structure of the blade 1, between the latter and a strip 9 of the cap 7 which is thus pulled up and torn off from the blade 1 by the displacement of the roller 40, driven by the gantry 17 as it is displaced with and behind the inductor 25, relative to its direction of displacement, as will be described in more detail below. The roller 40 is illustrated in FIG. 2 as being one which rotates about its axis on the end of an arm 41 providing a link to a rear upright 22 of the gantry 17 but this arm 41 has or is connected to means (not illustrated) for adjusting the position of the roller 40 relative to the cap 7, these adjusting means optionally being mechanical means which are manually controlled or optionally motorised means remotely controlled from the unit 24, for example, along with the motorised driving means 27, 32 and 36 which allow the position of the inductor 25 to be adjusted relative to the cap 7.

This device operates in the following manner. Firstly, the inductor 25 is positioned at a slight distance from and facing one end of the cap 7, for example the end 8 directed towards the blade root 3 and towards the rear edge (in accordance with the chord of the blade 1) of the upper surface wing 7a of this cap 7, so that when the gantry 17 is displaced on the frame 14 substantially from the blade root 3 towards the blade tip (not illustrated), the inductor 25 is displaced facing a longitudinal strip of the cap 7, this strip being bounded along the rear edge of its upper surface wing 7a. During this displacement, as illustrated in FIG. 4, the inductor 25 supplied with a high-frequency current from the generator 38 very rapidly heats this strip 9 of the cap 7 facing which the inductor 25 is displaced by induction and does so as the inductor 25 moves forward. This heated strip of the metal of the cap 7 in turn heats, by conduction, the adhesive substance 42 bonding the cap 7 to the underlying composite structure of the blade 1, and in particular a layer 42a of adhesive which is in direct contact with this strip 9 of cap 7 and which is raised to a temperature located in the region of the plastic range, the temperatures of which will depend on the temperature category of the adhesive, so that this layer 42a is softened to a point at which its bonding strength is reduced by some 80% as compared with its strength when the adhesive is cold, i.e. at normal ambient temperature. Since these bonding forces are reduced, it is easy to detach a tongue that will form the start of this strip 9 on the cap 7 as it is gradually heated by the inductor 25 and locate the roller 40 underneath this first piece of strip 9, so that as the gantry 17 is displaced it will drive the roller 40 to roll on the blade 1, between the latter and the tongue of the heated strip 9 of cap 7, thereby allowing this strip 9 to be mechanically torn off by hot-peeling, this tearing action being effected down to the thickness of the adhesive 42 and more specifically into the thickness of the softened layer of adhesive 42a, the intensity at which the cap 7 is heated by the inductor 25 and/or the displacement speed of the inductor 25 and the tearing roller 40 being controlled so that the interface between the composite structure of the blade 1 and a residual layer of adhesive 42b on this composite structure are prevented from overheating, for example to a temperature in excess of 90° C., which could damage this composite structure. The power and frequency settings for the high-frequency current supplying the inductor 25 and displacement speed of this inductor relative to the cap 7 are continuously adjusted so that an adhesive layer 42b which is substantially cool will always remain in contact with the composite structure of the blade 1.

Driving the roller 40 in contact with the heated strip 9 of the cap 7, along the length of this strip and between it and the blade 1, in conjunction with the displacement of the inductor 25 which heats this strip of cap 7 and the adhesive 42 immediately in front of the roller 40 in the common direction of displacement, produces an appropriate angle needed to loosen the bond between this heated strip 9 of the cap 7 and the structure of the blade 1 by tearing in a hot-peeling action, as illustrated in FIG. 4.

The monitoring and control unit 24 is able to control the thermal and kinematic behaviour of the system, since the unit 24 is pre-loaded with data pertaining to the type of blade 1 (geometric data and nature of constituent materials, hence critical surface temperature not to be exceeded), the type of adhesive 42 (in particular its plastic temperature range), and the type of cap 7 (dimensional data and nature of constituent material), and the unit 24 is also loaded with control and feedback control programmes, in particular for powering the inductor 25 and controlling its displacement speed with the gantry 17. The unit 24 may thus control the displacements of the inductor 25 relative to the gantry 17 as this gantry 17 is displaced on the frame 14, in order to correct the position of the inductor 25 relative to the changing contour of the blade 1 and the cap 7. In particular, the drive means 36 enable the distance between the tearing roller 40 and the inductor 25 to be adjusted in the direction of the length of the strip to be torn off, whilst the drive means 27 and 32 enable the position of the inductor 25 to be adjusted in accordance with the width of the cap 7, for tearing successive contiguous strips off from this cap 7, and/or the distance between this cap 7 and the inductor 25 depending on whether this inductor 25 is facing the upper surface 7a or lower surface wing of the cap 7 or is facing the part thereof having a smaller radius of curvature covering the actual leading edge 5 of the blade 1.

In particular, with the aid of a computer programme, the unit 24 can control the speed of the gantry 17 and hence that of the inductor 25 in response to the thermal power and, accordingly, to the power supply of the inductor 25 needed to impart to the adhesive 42 a temperature within the region of its plastic range, at least in the adhesive layer 42a in direct contact with the cap 7, under the strip heated by the inductor 25. This control system also enables safety settings to be entered with regard to the displacement kinematics of the inductor 25 or the tearing tool 40 with the gantry 17, for example by instantaneously cutting the power supply to the inductor 25, thereby cutting off the heating, if the displacement speed at any instant is 10% below a programmed nominal displacement speed of the inductor 25 relative to the heated strip of cap 7 for example, in order to protect the composite structure of the blade 1 effectively against overheating which could cause surface damage.

For safety reasons, in order to cool very rapidly the composite structure of the blade 1 in the region from which a strip 9 of the cap 7 has been torn away by hot-peeling and to avoid too high a transfer of heat by conduction from this strip 9 and the heated adhesive 42 to the underlying structure of the blade 1, the gantry 17 may support continuous cooling means such as a nozzle 43 for spraying cold compressed air in a direction towards the tearing roller 40 and the adjacent parts of the blade 1, the strip 9 of cap 7 and the adhesive layers 42a and 42b, this nozzle 43 being supported by an upright 22 of the gantry 17 and being supplied with compressed air from a flexible pipe 44. Accordingly, the structure of the blade 1 directly behind the tearing roller 40 relative to the direction of displacement of the gantry 17 can be cooled.

The unit 24 also allows feedback control of the displacement speed of the inductor 25 with the gantry 17 relative to the heated strip of cap 7 at least at one reference temperature, measured by at least one temperature sensor, shown by reference 45 in FIG. 2, driven by the gantry 17 and issuing a signal which is transmitted to the unit 24, this measured temperature optionally being the temperature on the cap 7 in the heated strip 9, for example between the inductor 25 and the tearing roller 40, or the temperature measured at the surface of the blade 1 immediately behind the roller 40, substantially at the interface between the blade 1 and the adhesive 42, or alternatively a temperature of the adhesive. If necessary, the unit 24 may receive temperature signals from several sensors driven with the gantry 17 or, in another variant, embedded in orifices provided at intervals in a strip to be torn out from the cap 7 and optionally in the adhesive 42 underneath this strip, down as far as the interface with the blade 1. In another variant, the unit 24 may also continuously monitor the temperature of the base, in this case the blade 1, by means of an infra-red pyrometer, displaced with the gantry 17, for example.

In particular, the unit 24 can provide feed back control of the displacement speed of the inductor 25 and/or the thermal power emitted by this inductor 25, i.e. in essence the power and frequency of the electric current supplying the inductor 25 from the generator 38, at least at one temperature, measured substantially at the surface of the blade 1 by the sensor 45 so as to interrupt or optionally reduce the heat output from the inductor 25 if this measured temperature reaches a predetermined threshold, for example 90° C., in order to avoid damaging the composite structure of the blade.

In order to optimise the exact positioning of the inductor 25 relative to the cap 7, the monitoring and control unit 24 may control the motorised driving means 27 and 32 in particular, so as to control the position of the inductor 25 relative to the surface of the strip of cap 7 facing it, on receiving a signal from a position sensor 46, for example of the roller follower type retained in resilient contact against the cap 7 by means of a leaf spring 47 supporting it at one end and fixed to the gantry 17 by its other end, and more specifically to the slider 29 driven by this gantry 17, so that the follower 46 is always substantially in front of the inductor 25 in relation to the direction of displacement of the gantry 17.

After tearing away a strip 9 of cap 7, by hot-peeling, across the entire length of this cap 7, the gantry and all its fixtures are returned to an initial position on the frame 14, the inductor 25 being switched off, and the position of the inductor 25 and the tearing roller 40 in particular is then adjusted in readiness for tearing off a strip of cap 7 adjacent to that which has just been removed, and so on from strip to strip until the entire cap 7 has been removed.

In order to facilitate removal of the successive strips, particularly if the lower and upper surface wings of the cap 7 are very wide, the device may also have a cutting tool 48, as illustrated in FIG. 3, for example a carbide disc cutter, which is driven by a mobile frame 17', similar to the gantry 17, or even by this gantry 17 of FIG. 2, on which mobile frame 17' or gantry 17 the 25 cutting tool 48 is so mounted that its position can be adjusted by mechanical means (not illustrated) which may be manually operated or motorised, enabling the cutting tool 48 to be positioned on the mobile frame 17' or the gantry 17 for cutting adjacent longitudinal strips such as 9a, 9b and 9c out from the cap 7. Additional mobile equipment comprising a second mobile 30 frame 17', displaced under the same conditions as the gantry 17 on the stationary frame 14, as well as one or more cutting tools 48, preferably spaced at an adjustable distance and positioned independently of one another on the mobile frame 17' so as to be better able to follow the contour of the cap 7 on the blade 1, may be used to cut adjacent strips into the cap 7 before removing these strips in succession by means of the device illustrated in FIG. 2.

However, if the cutting tool system is a single cutter 48, it may be driven by the gantry 17 of FIG. 2, on which the cutter 48 is positioned relative to the inductor 25 and the tearing roller 40 so as to cut from the cap 7 a strip in the order of n+1 or n+2, for example, the strip n being the strip in the process of being torn out by hot-peeling and hence heated by induction by means of the inductor 25 and torn up by the roller 40. Referring back to FIG. 3, for example, if the inductor 25 and the roller 40 of the device illustrated in FIG. 2 are in the process of tearing out the strip 9a of FIG. 3, the cutter 48 can be simultaneously driven by the gantry 17 during the phase at which the strip 9c or 9b is cut.

In order to avoid any heat damage to the underlying composite structure of the blade 1 due to the cutter 48 cutting the cap 7 into strips, cooling means such as a nozzle 43' for applying a jet of compressed air, similar to the nozzle 43 supplied by the flexible pipe 44 in FIG. 2, may be provided on the mobile frame 17' or may be provided in addition to the cooling means 43, 44 on the gantry 17, if necessary.

It is clear that cutting a strip of cap 7 before it is torn out after heating will facilitate this process of stripping by hot-peeling.

The cooling means such as 43 and 43' as well as the cutting means such as the cutter 48 may also be controlled continuously, with regard to position and/or supply, by the unit 24, which co-operates with the device described above, preferably to ensure continuous operation, although control may also be on a step by step basis if necessary.

In the regions of the cap 7 linked to the blade 1 by weaker bonding forces, for example in the very curved zone of the cap 7 on a level with the actual leading edge 5 of the blade 1, this region being one where the radius of curvature is small and which extends across a short chord distance on the lower and upper surface wings of the cap 7, a cold-peeling process may be used for stripping, in a manner such as conventionally applied when opening a can of sardines with a key, in order to finish the hot-peeling operations in the less curved areas of the cap 7 which are more firmly bonded to the blade 1. This lower bonding strength in the highly curved part of the cap 7 is due to manufacturing tolerances in the parts nested one inside the other, these being the structure of the blade 1 in the vicinity of the leading edge and the substantially U-shaped curved cap 7.

The method of tearing out strips by hot-peeling proposed by the invention can therefore be completed by at least one stripping step by cold-peeling as practised in the prior art or alternatively initiated or started off by cold-peeling at the start of each strip, using a tool of the type used for a sardine can, before finishing the stripping process by hot-peeling.

The inductor 25 is an inductor of a known type, having two ferrite coils, the two coils being cooled by circulating water and insulated by an appropriate paint for example, the inductor 25 being connected by connector conductors either directly to a high-frequency generator 38, of the MOSFET transistor type (Metal Oxide Semiconductor Field Effect Transistor) for example, or any other appropriate means, isolated from the electric supply network by a transformer, or to a control cabinet mounted on the gantry 17 and in turn connected by a high-frequency linking cable to the generator at a fixed station.

A generator of the MOSFET transistor type, which may be used to power an inductor with two ferrite coils, is a well known component and will not be described in detail since it does not form part of the invention.

Furthermore, it should be pointed out that with a tearing tool such as the roller 40, the device proposed by the invention will enable the strips 9 to be kept linear rather than spiralled, thereby avoiding the above-mentioned drawbacks of the prior art.

What is claimed is:

1. A device for removing an electromagnetic induction sensible leading edge protective cap bonded by a heat-fusible adhesive onto a rotor blade, wherein said device comprises:

at least one stationary frame on which said rotor blade fitted with said cap is fixed;

at least one mobile frame, which can be displaced relative to the stationary frame and bearing at least one mobile inductor and at least one mobile tearing tool, which are displaced respectively opposite at least one strip of said cap and in contact with said strip and substantially along the latter or between said strip and said rotor blade when said mobile frame is displaced relative to said stationary frame, whereby successive strips of the cap may be torn off;

first means for controlling the displacement of said mobile frame together with said mobile inductor and said mobile tearing tool on said stationary frame in at least a first direction, substantially across the length of at least one strip of cap to be removed; and second means for controlling the positioning of said inductor and/or said tearing tool by displacement on said mobile frame in at least a second direction, transversely to said first direction, and substantially across the width of said strip of cap.

2. A device as claimed in claim 1, further including third means for controlling the positioning of said inductor by displacing the inductor on said mobile frame in a third direction, substantially perpendicular to the first and second directions in order to adjust the space between said inductor and a strip of cap to be removed.

3. A device as claimed in claim 2, further including fourth means for positioning the inductor and/or the tearing tool on the mobile frame at least substantially in said first direction in order to adjust a gap between the inductor and the tearing tool.

4. A device as claimed in claim 3, further including at least one jet of compressed air, which are driven by said mobile frame in order to cool said rotor blade behind the tearing tool relative to the direction of displacement thereof.

5. A device as claimed in claim 4, further including at least one tool for cutting out strips, from said cap, said cutting tool also being driven by a frame which is mobile relative to said stationary frame.

6. A device as claimed in claim 1, further including at least a monitoring and control unit remotely controlling at least an electric supply of high frequency current to the inductor and, at least one of said first, second, third and fourth means for controlling the displacement of the mobile frame relative to the stationary frame and the positioning one at least of the inductor, tearing tool, cooling means and cutting tool on the mobile frame.

7. A device as claimed in clam 1, wherein said tearing tool includes a roller which rolls on said rotor blade, tearing therefrom a strip of cap that has just been heated.

8. A device as claimed in claim 1, further including at least one temperature sensor and/or at least one sensor to detect the position of said inductor relative to said cap, said temperature and/or position sensor being mounted on said mobile frame.

* * * * *